United States Patent [19]

Kleine et al.

[11] 4,224,817
[45] Sep. 30, 1980

[54] APPARATUS AND PROCESS FOR MAKING TUBE IN SHEET HEAT EXCHANGERS

[75] Inventors: Charles A. Kleine, Florissant, Mo.; Kenneth Belangee, Alton, Ill.

[73] Assignee: Olin Corporation, New Haven, Conn.

[21] Appl. No.: 7,585

[22] Filed: Jan. 29, 1979

[51] Int. Cl.³ .............................................. B23P 15/26
[52] U.S. Cl. .................................. 72/54; 29/157.3 V; 72/61
[58] Field of Search .................... 72/54, 61, 379, 479; 228/157, 118, 191; 29/157.3 V, 157.3 R, 421 R; 113/118 R

[56] References Cited

U.S. PATENT DOCUMENTS

| 2,662,273 | 12/1953 | Long | 29/157.3 V |
|---|---|---|---|
| 2,690,002 | 9/1954 | Grenell | 29/157.3 V |
| 2,691,815 | 10/1954 | Boessenkool | 228/197 |
| 2,740,188 | 4/1956 | Simmons | 29/157.3 V |
| 2,753,623 | 7/1956 | Boessenkool | 228/205 |
| 2,835,025 | 5/1958 | Pauls | 29/157.3 V |
| 2,938,413 | 5/1960 | Pauls | 29/157.3 V |
| 3,004,327 | 10/1961 | Keith | 29/157.3 V |
| 3,037,277 | 6/1962 | Pauls | 29/157.3 V |
| 3,045,618 | 7/1962 | Adam | 29/157.3 V |
| 3,061,924 | 11/1962 | Brick | 228/118 |
| 3,271,846 | 9/1966 | Buechele | 29/157.3 V |
| 3,346,936 | 10/1967 | Miller | 228/157 |
| 3,377,683 | 4/1968 | Tranel | 29/157.3 V |
| 3,397,045 | 8/1968 | Winter | 428/612 |
| 3,408,723 | 11/1968 | Myers | 29/157.3 V |
| 3,435,504 | 4/1969 | Miller | 29/157.3 V |
| 3,465,568 | 9/1969 | Jonason | 29/157.3 V |
| 4,021,901 | 5/1977 | Kleine | 29/157.3 V |
| 4,066,121 | 1/1978 | Kleine | 165/170 |
| 4,093,024 | 6/1978 | Middleton | 29/157.3 V |

FOREIGN PATENT DOCUMENTS 212814 1/1957 Australia .

Primary Examiner—Francis S. Husar
Assistant Examiner—Gene P. Crosby
Attorney, Agent, or Firm—Paul Weinsten

[57] ABSTRACT

A process and apparatus is provided for forming an opening in a composite metal panel. The edge of the panel is hammered to delineate a bond interface. The hammering includes both moving a hammering member to and fro against the edge while simultaneously rocking the member about the edge. This provides improved delineation of the bond interface for further processing.

21 Claims, 15 Drawing Figures

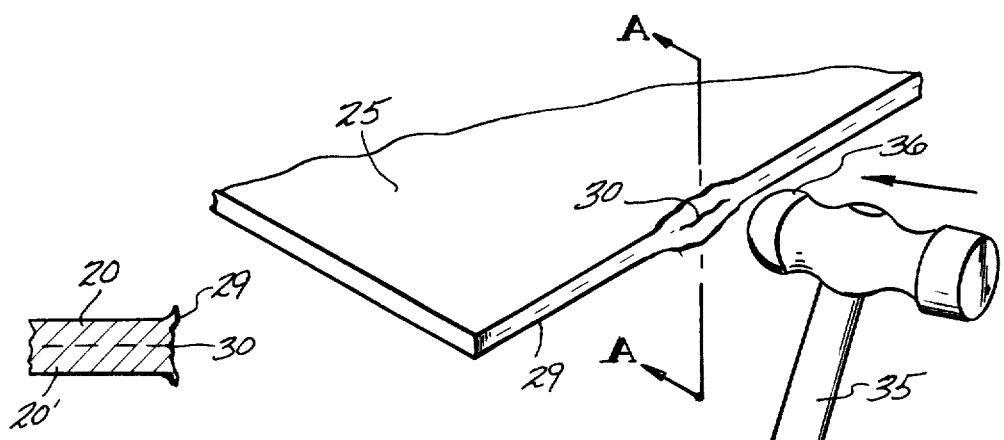
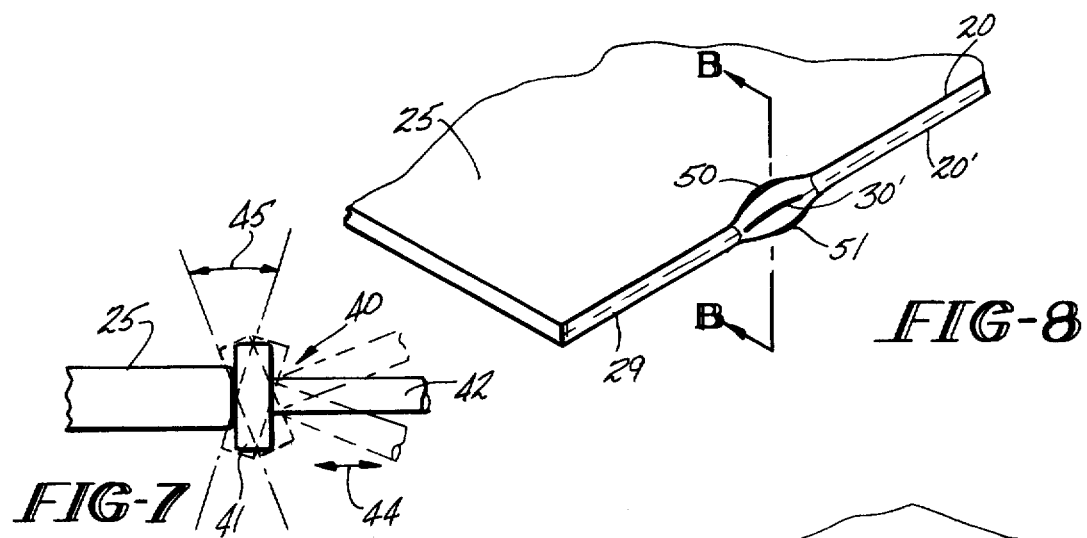
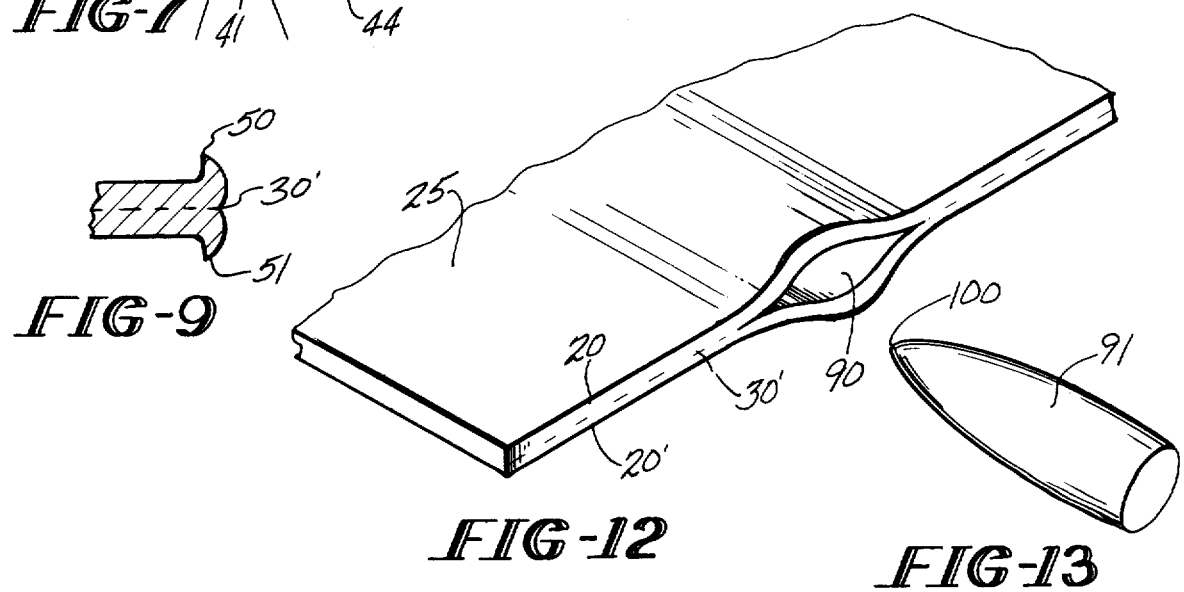

APPARATUS AND PROCESS FOR MAKING TUBE IN SHEET HEAT EXCHANGERS

BACKGROUND OF THE INVENTION

This invention relates to an improved process and apparatus for making tube in sheet type heat exchange panels. These panels find particular application in solar energy collectors and related type devices.

PRIOR ART STATEMENT

Tube in sheet type heat exchange panels have been made commercially for many years by the ROLL-BOND ® process as exemplified in U.S. Pat. No. 2,690,002 to Grenell. These panels have found wide commercial application in refrigerator heat exchangers. More recently they have found application in the field of solar energy as absorber panels, etc., as exemplified in U.S. Pat. Nos. 4,021,901 and 4,066,121 to Kleine et al. and U.S. Pat. No. 4,093,024 to Middleton.

The ROLL-BOND ® process has proved to be highly effective for those applications, however, there are some difficulties associated with the process. One difficulty is the inability to precisely control the final shape and location of the pattern of stop weld material sandwiched between the composite metal sheets after they have been bonded together. The aforenoted difficulties result in the need for large tube free portions at the sides and ends of the panels, which can greatly reduce their efficiency and increase the cost of the panels.

While the ROLL-BOND ® process as set forth in the Grenell patent has found worldwide commercial application, other processes for obtaining tube in sheet type panels are also known. One of those processes comprises an approach wherein the composite metal sheets are "green" bonded together without a stop-weld pattern and the tubular pattern is formed by inflation in a die whose cavity defines the tubular pattern. Various examples of this process are set forth in U.S. Pat. Nos. 3,271,846 to Buechele et al., 3,346,936 to Miller et al., 3,435,504 to Miller and 3,465,568 to Jonason and in Australian Pat. No. 212,814 to Watson.

In the Australian patent to Watson there is disclosed a process for making heat exchangers wherein clean faced sheets of metal are roll forged to provide a bond that can be broken by internal pressure. The bonded sheets are placed in a matrix die having a cavity or cavities therein corresponding to the shape and configuration of the ducts required in the heat exchanger. Pressure is applied to inflate the respective ducts, etc., in conformity with the die cavity. The process as disclosed can be carried out without a bond enhancement heat treatment.

The Miller patent describes the use of the bonding process employing cold rolling as disclosed in U.S. Pat. Nos. 2,691,815 and 2,753,623 to Boessenkool et al. Another known bonding process wherein sheets are strongly bonded together by cold rolling is disclosed in U.S. Pat. No. 3,397,045 to Winter.

The tubular patterns in the tube in sheet type heat exchange panels described above are formed by inflation. In order to inflate the panel it is necessary to insert an inflation needle into an edge thereof. As described in U.S. Pat. Nos. 2,835,025, 2,938,413 and 3,037,277, all to Pauls, it has been known to shear the edge of the panel on a bias in order to delineate the stop-weld pattern at the bond line. The lower lip of the panel is then bent away from the upper lip to further delineate the bond line. A punch is then inserted between the sheets to form an opening into which the inflation needle can be inserted.

It is known as described in the U.S. Pat. No. 3,037,277 patent to utilize a vibratory type punch or chisel for opening up the passageway. In U.S. Pat. No. 3,045,618 to Adams a combined vibratory punch and inflation tool is desribed. U.S. Pat. Nos. 3,004,327 to Keith et al., 3,377,683 to Tranel and 3,408,723 to Myers are illustrative of other tool designs used for forming an opening from an edge of the panel.

The approaches described above for mechanically forming the opening work quite well when utilizing the ROLL-BOND ® process which employs a stop-weld material. The stop-weld is generally markedly different in color than the metal of the panel and, therefore, clearly delineates the bond line where the chisel for opening the tube is to be inserted. This delineation is further enhanced when the edge of the panel is sheared on a bias as desribed in the Paul's patents.

When one utilizes the "green" bond process for forming the composite metal panels, it has been found that it is very difficult to identify the bond line between the respective sheets of the panel for insertion of the chisel or punch. This occurs because there is no stop-weld pattern to delineate the bond line as in the ROLL-BOND ® process. The bond line must be delineated in order to properly position the chisel at the edge of the panel for forming the inflation opening.

In U.S. application Ser. No. 7,556, filed of even date herewith by Belangee, a process and apparatus is described wherein a composite metal panel formed by the "green" bond process is hammered at an edge thereof in order to delineate the bond line between the sheets of the composite. Thereafter, a chisel or punch is inserted at the delineated bond line to form an opening in the panel. The hammering is disclosed as being carried out using an ordinary ball-peen hammer.

SUMMARY OF THE INVENTION

In accordance with this invention an improved process and apparatus is provided for making heat exchanger panels particularly adapted for use in solar application. Clean face sheets of metal are bonded together by cold rolling to a desired reduction in thickness to form a composite having a "green" bond which can be broken at reasonable inflation pressures. An inflation or other type opening between the sheets is formed in the panel from an edge thereof. In order to delineate the bond line between the sheets of the panel at the position along the panel edge where the opening is to be formed the edge is hammered. In accordance with this invention, the hammering is carried out with an added rocking motion. This is effective to curl back the sheets to form spaced apart lips which permit easy insertion of a chisel or punch at the bond line of the panel.

In accordance with this invention a unique hammering tool is provided having a cylindrical shape whose curved surface is urged against the edge of the panel during hammering with the axis of the cylinder being arranged generally normal to the faces of the panel. This type of tool facilitates the hammering and rocking motion required. Further, in accordance with this invention an apparatus and process is provided wherein a panel can be automatically clamped and hammered as described above.

Accordingly, it is an object of this invention to provide an improved process and apparatus for making heat exchanger panels.

It is a further object of this invention to provide an improved process and apparatus as above wherein a "green" bonded composite metal panel is hammered at an edge thereof with an added rocking motion to delineate the bond line.

These and other objects will become more apparent from the following description and drawings.

BRIEF DESCRIPTION OF THE DRAWINGS

FIG. 5 is a partial perspective view of a panel and hammering apparatus in accordance with the Belangee application described above;

FIG. 6 is a partial cross-sectional view along the line A—A in FIG. 5;

FIG. 7 is a partial schematic representation of a hammering apparatus in accordance with this invention;

FIG. 8 is a partial perspective view of a panel in accordance with this invention after hammering to curl back the sheet edges.

FIG. 9 is a partial cross-sectional view of the panel in FIG. 8 along the line B—B;

FIG. 12 is a partial perspective view of a panel in accordance with this invention having an opening at an edge thereof;

FIG. 13 is a perspective view of a chisel or punch for forming the opening in the panel of FIG. 12;

DETAILED DESCRIPTION OF PREFERRED EMBODIMENTS

Figure 1:
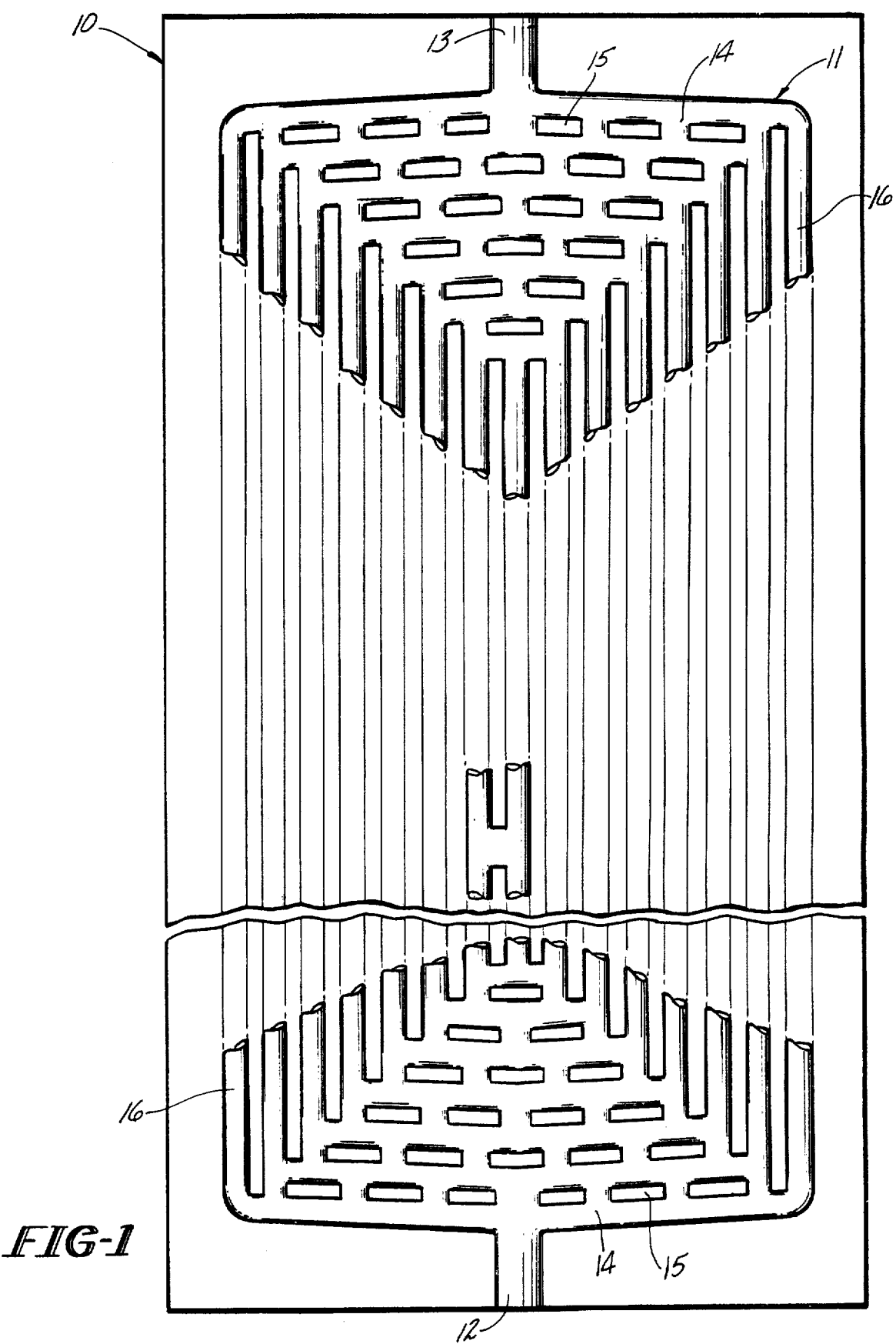
FIG. 1 is a schematic illustration of a heat exchanger panel in accordance with this invention.

Referring now to FIG. 1 there is shown by way of example a schematic illustration of a heat exchanger panel 10 useful in applications involving solar energy. For example, the panel 10 is useful as an absorber plate in a solar energy collector. The panel shown in FIG. 1 is representative of a plank type panel which is approximately about 12 inches wide and from 6 to 10 feet long. Absorber panels 10 having various sizes are known in the art. The panel 10 itself is of a tube in sheet configuration. The panel is formed from composite metal sheets which remain bonded together everywhere except where tubular passageways 11 or channels have been expanded within the composite. A variety of techniques have been utilized to form tube in sheet type heat exchanger panels as described in the background of the invention. The present invention is particulary directed to an apparatus and process for forming a tube in sheet heat exchanger as in FIG. 1 by first "green" bonding the composite sheets together followed by die inflation.

The specific design of the panel 10 shown in FIG. 1 includes entry 12 and exit ports 13 communicating with triangular shaped headers 14. The headers 14 include a plurality of bonded islands 15 for obstructing and directing the flow of the heat exchange fluid to provide uniform flow across the width of the panel 10. The triangular shaped headers 14 are connected together by a plurality of parallel tubular passageways 16.

Figure 2:
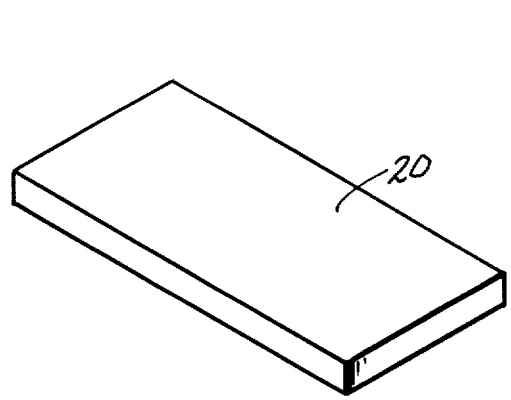
FIG. 2 is a perspective view of a metal sheet used to make a composite panel in accordance with this invention.
Figure 3:
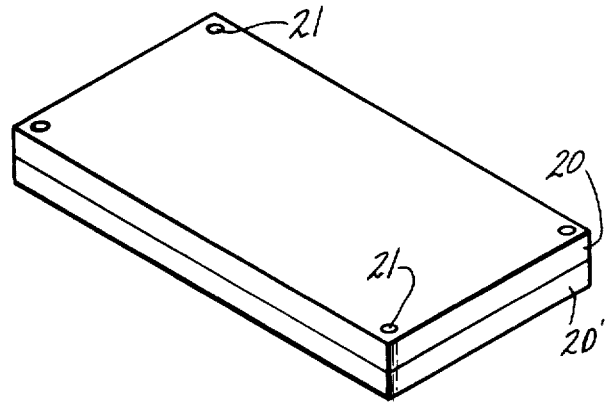
FIG. 3 is a perspective view of overlapped and staked sheets prior to bonding.
Figure 4:
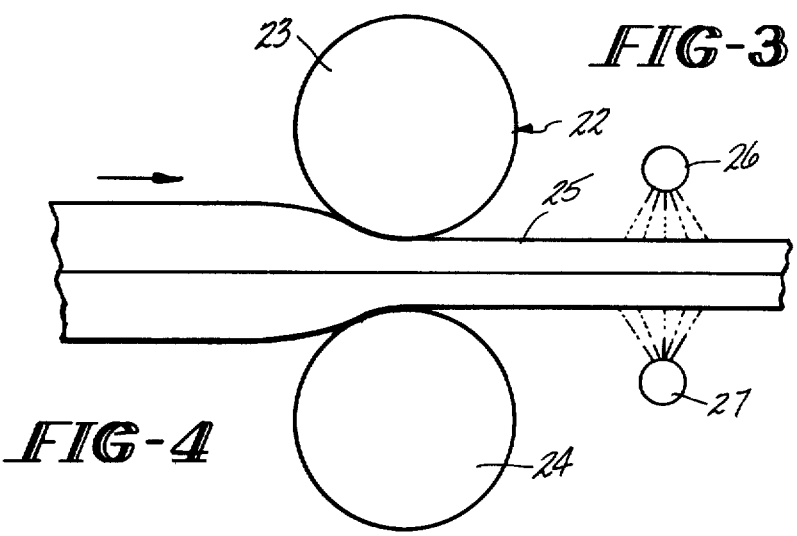
FIG. 4 is a schematic representation of an apparatus for bonding the sheets of FIG. 5 in accordance with this invention.

In accordance with this invention the composite metal panels may be formed from panel size strips of metal 20 such as shown in FIG. 2. Two such strips 20 and 20' having at least one face brushed or otherwise suitably cleaned are placed in overlapping relationship as in FIG. 3 with the cleaned faces in engagement. They are staked 21 together at the corners of the panels in accordance with conventional practice. The staked sheets are then fed as in FIG. 4 through the nip of a cold rolling mill 22 to provide the desired "green" bond. The rolling mill comprises rolls 23 and 24 which subject the overlapped sheets to a desired reduction in thickness to provide a so-called "green" bonded composite metal panel 25 having a moderate degree of bond strength. Immediately adjacent to the rolling mill and in close proximity downstream thereof there is preferably positioned a coolant application station 26 wherein coolant is applied to the as-bonded composite metal panel 25 from above in order to reduce its temperature to a temperature below which substantial bond enhancement will not occur. If desired, an auxilary coolant application station 27 could be located below the panel 25 to apply the coolant to the bottom surface of the panel as well. Alternatively, the coolant application station 27 alone could be used in place of the station 26.

The cold rolling described above is normally carried out at relatively high speed. Further details of the process for making the bonded composite metal panels may be found be reference to U.S. application Ser. No. 937,118, filed Aug. 28, 1978 to Winter. As described in the above Winter application, the composite metal panels can be formed from coiled strip which is continuously bonded and then cut to desired panel lengths.

In U.S. application Ser. No. 937,336, filed Aug. 28, 1978 by Winter et al., a process and apparatus is disclosed for inflating tubular passageways in composite metal panels formed as just described. Winter et al. suggest that the inflation opening in the composite metal panel be formed by conventional techniques such as those described in the background of this application. While it is possible to utilize those techniques, difficulties have been encountered in practice in determining where the bond line lies at the panel edge between the sheets which make up the composite. It is necessary to identify the bond line in order to properly position the chisel for forming the inflation opening.

In practice for panels comprised of metal sheets of approximately the same color it is difficult to actually identify the bond line. This problem is overcome in accordance with the abovenoted Belangee application as shown in FIGS. 5 and 6 by upsetting the edge 20 of the panel 25 at a position 30 where the inflation opening is to be formed. The upsetting operation comprises hammering the edge 29 of the panel to deform it and cause the bond between the sheets 20 and 20' at the edge where the hammering is applied to break. This results in a crack-line separation 30 between the sheets 20 and 20' at the edge 29 which is effective to delineate the bond line or bond interface. After the bond line 30 has been delineated it is possible to form an inflation or other type opening through the use of a conventional chisel or punch tool.

In the Belangee application the hammering is carried out by hand using a conventional hammer 35. Preferably, a ball-peen hammer is used as shown. Using the balled or curved surface 36 of the hammer is preferred. While a ball type hammer face 36 is preferred any desired hammer shape could be utilized which will provide the desired upset of the panel edge 20 and cracking apart of the sheets of the panel to delineate the bond line 30.

Referring now to FIG. 7 in accordance with this invention, the hammering is carried out using a specially designed tool 40. The tool includes a cylindrical hammer head 41 which is mounted on a tool shaft 42 which is adapted for insertion in a suitable vibrator 43 as in FIG. 10. The cylindrical axis of the head 41 is arranged normal to the shaft 42. The vibrator 43 can be actuated pneumatically or electrically and imparts an up and back motion in accordance with arrow 44 to the head 41 to provide a hammering action as in accordance with the abovenoted Belangee application.

In accordance with this invention, however, in addition to moving the hammer head 41 to-and-fro it is also pivoted about the plane of the panel 25 in a rocking type motion as shown in phanton and by the arrow 45.

Referring to FIGS. 8 and 9, the result of the combined to-and-fro and rocking type hammering in accordance with the present invention is a marked improvement in the delineation of the bond line 30. In using the approach of Belangee a crack 30 is formed between the sheets 20 and 20' in the hammered area which delineates the bond line as shown in FIGS. 5 and 6. However, the actual separation of the sheets 20 and 20' is relatively small so that it can be difficult to insert the chisel between the sheets. In accordance with this invention, however, the edges of the sheets 20 and 20' are rolled apart in opposite directions to provide rolled back lips 50 and 51 and a wide separation of the sheets at the bond line 30'. This structure makes it relatively easy to seat a chisel or punch against the panel edge 29 at the bond line 30' in order to form the desired opening.

It is preferred in accordance with this invention to provide an apparatus for conducting the aforenoted operations in an automatic or semi-automatic manner. To accomplish this the panel 25 is conveyed to a peening station 60 where it is clamped between a hydraulically actuated ram 61 and a stationary anvil 62. The moveable ram clamp 61 is hydraulically actuated by means of hydraulic cylinder 63 in order to provide for automatic timed actuation if desired. The peening or hammering tool 40 as desrcibed by reference to FIG. 7 is supported in the vibrator 43 which can be similar to the one described in the Pauls U.S. Pat. No. 3,037,277 patent noted above. The vibrator 43 with the peening tool 40 is pivotally supported in a U-shaped frame 70. The U-shaped frame 70 is secured to a moveable carriage 71 which slides in a recess 72 of a main frame member 73 which also supports the anvil 62.

The vibrator 43 may be pivoted at any position along its length to provide the desired stroke of rocking movement. In the embodiment shown the vibrator 43 is pivoted near its front end. A cam follower 74 is secured to the tool near its back end. The cam follower 74 is arranged to ride in engagement with an oval shaped cam 75 supported on shaft 76. The shaft 76 is journaled for rotation in a U-shaped frame 77 which is secured to the carriage 71. The shaft 76 also supports a pulley 78 to drive the cam 75. The motor 79 is secured to the moveable carriage 71. A pulley 81 supported on the motor 79 shaft drives pulley 78 through belt 80. A second hydraulic cylinder 82 is provided via connecting shaft 83 for moving the carriage 71 and the peening tool 40 into and out of engagement with the edge 29 of the panel 25.

Figure 10:
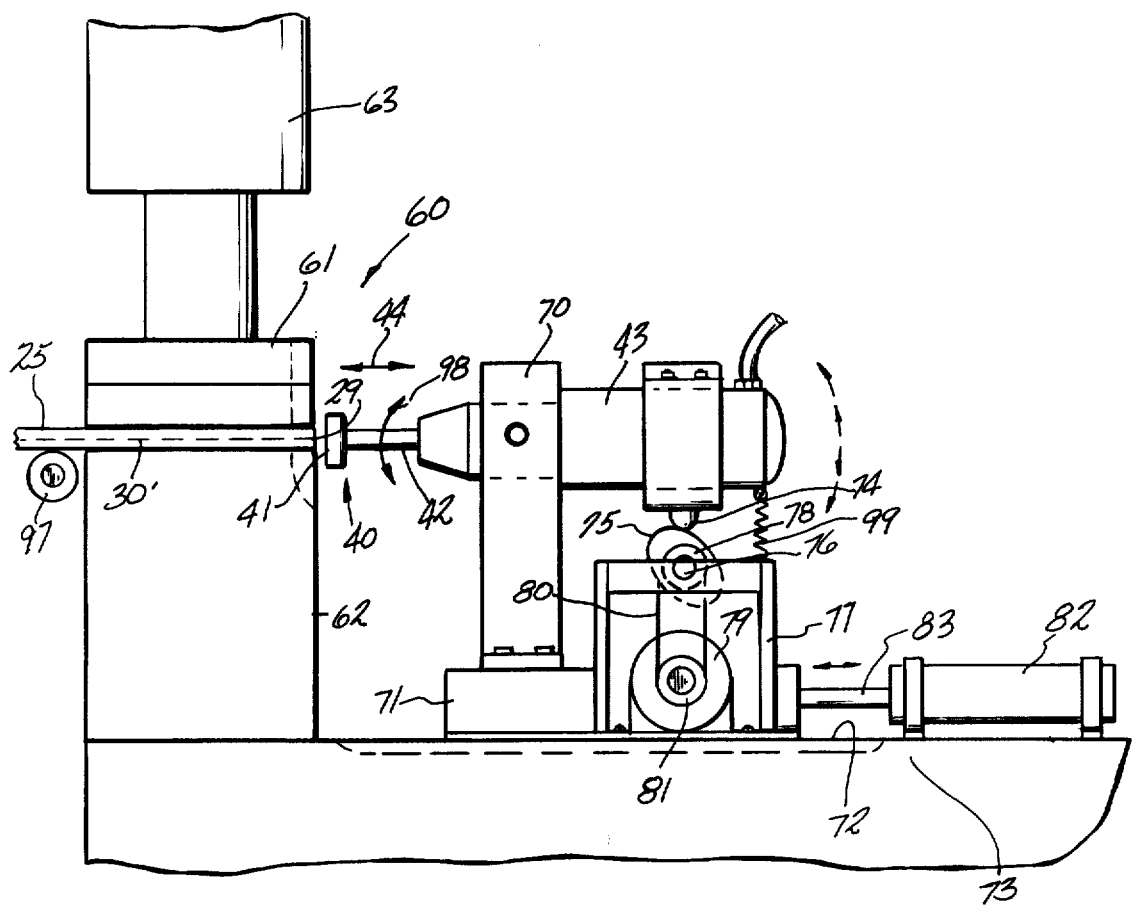
FIG. 10 is a schematic side view of an apparatus in accordance with this invention.

The apparatus 60 as depicted in FIG. 10 is adapted to carry out both the hammering or peening operation and the chiseling operation for forming the desired opening 90. This is accomplished by first inserting the hammering tool 40 in the vibrator 43 and performing the hammering operation followed by changing the tool to a chiseling tool 91 as in FIG. 13 and performing the chiseling operation to form the desired opening 90 as in FIG. 12.

Figure 11:
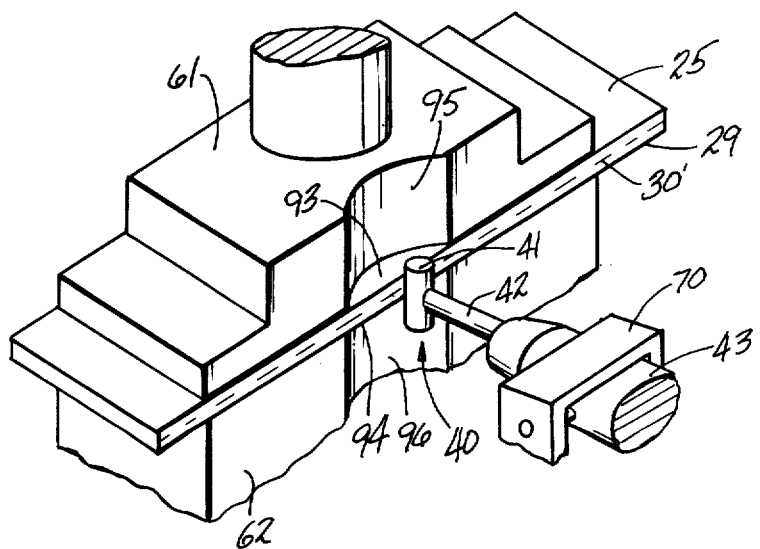
FIG. 11 is a partial perspective view of an apparatus in accordance with this invention.

Referring now to FIGS. 11 and 12 the panel 25 is clamped from its edge 29 and extending inwardly on opposite sides of the desired opening 90. The length of the panel 25 which is clamped in a direction normal to the panel edge 29 is governed by the length of the opening 90 which is to be formed. The panel 25 is clamped on both sides of the opening 90 for a length which is preferbaly at least as great or greater than the length of the opening which will be formed. This is intended to control the breaking of the bond between the sheets 20 and 20' and prevent them from separating over a wider area than desired.

The moveable clamping member 61 and the anvil 62 both include recesses 93 and 94 which allow the panel to be expanded when the opening 90 is formed by the chisel 91. Arcuate notched portions 95 and 96 are provided in the ram 61 and the anvil 62 in order to allow for the hammer tool movement in operation.

In operation a panel 25 is conveyed from the bonding station 22 to the clamping station 60 by means of a conventional conveyor such as roll 97. When the panel 25 is positioned in the clamping station 60 as shown in FIG. 10, the moveable ram 61 is actuated by the cylinder 63 to clamp the panel tightly against the stationary anvil 62. The peening tool 40 is inserted in the vibrator 43 as shown. The cylinder 82 is then actuated to move the carriage 21 which supports the vibrator 43 so that the tool 40 is placed into engagement with the panel edge 29 for at least a portion of its vibratory stroke. The vibrator 43 and the motor 79 are then turned on simultaneously to cause the peening tool 40 to hammer against the edge 29 of the panel 25 in the direction of arrow 44 while the tool 40 is rocked in the direction of arrow 98 by the pivoting movement of the vibrator 43 which is effected by means of the cam 75 and follower 74 arrangement shown. The weight of the vibrator 43 is probably sufficient to provide an appropriate cam following action. However, it is preferred that a tension spring 99 connected between the vibrator 43 of the frame 77 be employed in order to insure engagement between the cam and follower.

The operation takes place very quickly in a few seconds. The stroke and vibratory movement imparted by the vibrator to the peening tool may be essentially the same as described by reference to the Pauls U.S. Pat. No. 3,037,277 patent. Preferably, the vibrator actuates the tool at about 1000 blows per minute to about 10,000 blows per minute. The motor and cam arrangement should oscillate the vibrator through its arcuate stroke at a desired rate which will provide the rolling back of the sheet edges. A rotation of the cam at a rate of from about 20 revolutions per minute to about 300 revolutions per minute should be acceptable.

After the peening or hammering operation has been completed the cylinder 82 is activated to withdraw carriage 71 and peening tool 40 from engagement with the panel edge 29. The motor 79 is stopped at a position such that the cam 75 and follower 74 hold the vibrator 43 generally horizontal with the axis of the tool shaft 42 being parallel to the plane of the panel 25. The peening tool 40 is then removed and a chisel 91 as in FIG. 13 is inserted in its place. Upon actuation of the cylinder 82 the chisel tool 91 is moved into engagment with the panel edge 29 at the hammered portion. The sharp edge or point of the chisel is easily located at the bond line 30′ because of the exaggerated spacing of the sheets 20 and 20′ at the bond line due to the peening operation of this invention. The vibrator 43 is then actuated to hammer the chisel into the panel 75 between the sheets 20 and 20′ to form the desired opening 90. The cylinder 82 provides the necessary movement to force the chisel 91 into the panel 25.

In this manner semi-automatic or automatic operation can be achieved with a "green" bond type panel 25 wherein no stop weld pattern has been utilized in the panel and wherein the edges of the panel are sheared in a convention manner so that they are arranged normal to the faces of the panel. The provision of the combined rocking and hammering operation in accordance with this invention provides a substantial improvement in the delineation of the bond line 30′ and allows the chiseling tool 91 to be readily set at the bond line for forming a desired opening 90 in the panel. Preferably, the opening which is formed comprises an inflation opening.

Figure 14:
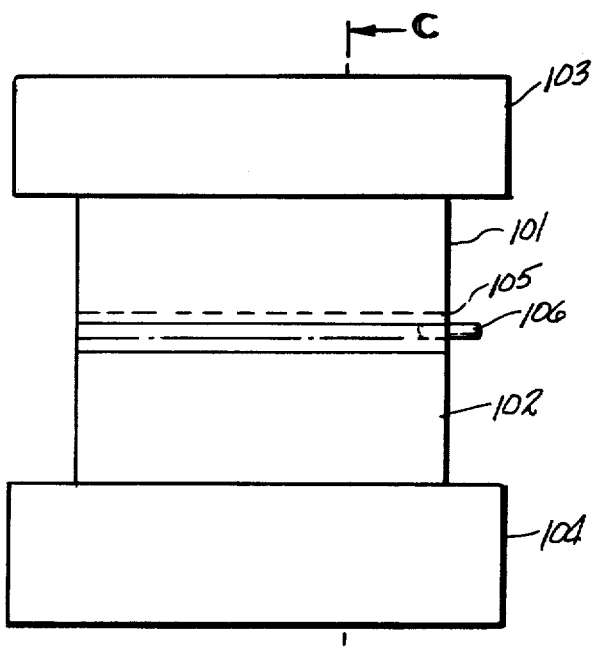
FIG. 14 is a schematic representation of a die inflation apparatus in accordance with this invention.
Figure 15:
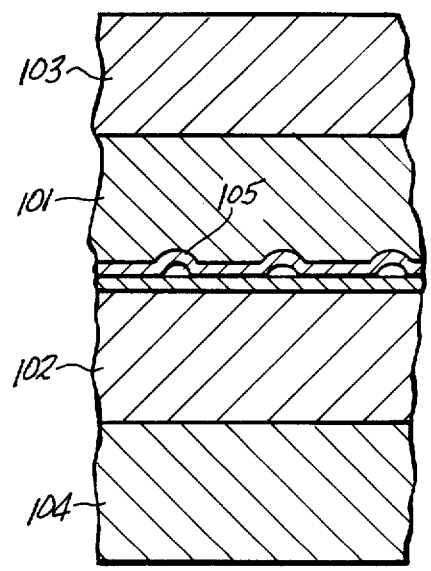
FIG. 15 is a partial cross-sectional view of the die inflation apparatus of FIG. 14 along the line C—C.

At this point, the panel 25 manufactured by the process described above is placed between die plates 101 and 102 as in FIGS. 14 and 15. The die plates 101 and 102 are clamped by conventional means such as press 103 and 104 to tightly seal the composite panel 25 between them. At least one of the die plates includes a cavity 105 defining the desired pattern of tubular passageways 11 in the heat exchange panel 10. In the embodiment shown in FIGS. 14 and 15 only one of the die plates 101 and 102 includes such a cavity 105 so that the tubular passageways 11 which result will have one side flat. While only one die 101 has a cavity in the embodiments shown, if desired the opposing die 102 can have a cavity in correspondence with the cavity of the die 101 to provide tubular passageways 11 expanded out from both sides of the panel 25.

The tubular passageways are formed in the composite panel 25 by the application of fluid pressure. This is accomplished by inserting an inflation needle 106 into the inflation opening 90 at the edge 29 of the panel 25 in communication with the desired tubular passageway pattern. Air or other suitable fluid is then forced into the composite panel to break the "green" bond between the sheets 20 and 20′ in the region of the die cavity 105 where the sheets are not clamped together. Continued pressure deforms the sheets into conformity with the die cavity 105 thereby forming the desired passageway pattern in the composite panel 25. Suitable inflation pressures comprise from about 1000 to about 4000 psi. Inflation can be carried out pneumatically or hydraulically, however, pneumatic inflation is preferred.

"Green" bond as the term is used herein refers to a bond of moderate strength which will not break in ordinary handling but which will break at inflation pressures within the abovenoted range of from about 1000 to about 4000 psi. Bond enhancement as the term is used herein refers to an increase in bond strength after completion of the bonding operation, e.g., cold rolling. Bond enhancement is a kinetic process dependent on temperature and time at temperature, with the temperature being far more significant than the time.

Bond line as the term is used herein refers to the bond interface between the sheets of the composite panel. The bond line need not extend in a linear fashion.

The process and apparatus of this invention are applicable to a wide range of metals and alloys including copper and copper alloys, aluminum and aluminum alloys as noted above as well as iron and iron alloys and the alloys of other engineering metals. Particularly preferred metals and alloys include high copper alloys for good conductivity and cupro-nickel alloys for corrosion resistance.

The patents and patent applications which are set forth in this application are intended to be incorporated by reference herein.

It is apparent that there has been provided in accordance with this invention a process and apparatus for making heat exchanger panels therefrom which fully satisfy the objects, means and advantages set forth herein before. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In an apparatus for forming an opening in a composite metal panel comprising at least two sheets of metal having a bond therebetween which can be broken by inflation, said opening extending between said sheets of metal and inwardly of said panel from an edge thereof, said composite metal panel being adapted for forming a heat exchanger therefrom having a desired pattern of inflated tubular passageways therein; said apparatus comprising:

means for hammering with a blunt surface said edge of said panel at a position wherein said opening is to be formed for delineating a bond interface between said sheets of said panel; the improvement wherein:

said hammering means includes a hammering member and means for moving said hammering member to and fro against said edge while simultaneously rocking said member about said edge and a plane of said panel, said hammering means being adapted to upset the metal of said panel at said position at said edge so that said bond interface is delineated by widely spaced lips formed on said sheets;

whereby improved delineation of said bond interface is provided.

2. An apparatus as in claim 1 further including means adapted to be positioned at said delineated bond interface at said edge of said panel for forming said opening.

3. An apparatus for forming an opening in a composite metal panel comprising at least two sheets of metal having a bond therebetween which can be broken by inflation, said opening extending between said sheets of metal and inwardly of said panel from an edge thereof, said composite metal panel being adapted for forming a heat exchanger therefrom having a desired pattern of inflated tubular passageways therein, said apparatus comprising:
- means for hammering said edge of said panel at a position wherein said opening is to be formed for delineating a bond interface between said sheets of said panel, said hammering means including a hammering member and means for moving said hammering member to and fro against said edge while simultaneously rocking said member about said edge, said hammering member comprising a cylindrical member defining a cylindrical hammer surface which is adapted to engage said edge of said panel, said cylindrical member defining a cylinder axis, said means for simultaneously rocking said member being adapted to cause said cylinder axis to rock about a plane of said panel; and
- means adapted to be positioned at said delineated bond interface at said edge of said panel for forming said opening;
- whereby improved delineation of said bond interface is provided.

4. An apparatus as in claim 3 wherein said hammering means is adapted to upset the metal of said panel at said position at said edge, and wherein said bond interface is delineated by widely spaced lips formed on said sheets.

5. An apparatus as in claim 4 wherein said means for moving said hammering member to and fro relative to said panel edge, comprises a vibrator and wherein said means for rocking said member comprises means for reciprocally pivoting said vibrator.

6. An apparatus as in claim 5 further including carriage means for supporting said vibrator and said pivoting means and means connected to said carriage means for moving said carriage means to and fro relative to said panel edge in order to engage or disengage said hammering member with said panel edge.

7. An apparatus as in claim 6 further including a frame for movably supporting said carriage means and means for clamping and supporting said panel connected to said frame, said clamping means being adapted to clamp portions of said panel which are not to be opened while leaving unclamped a portion of said panel wherein said opening is to be formed.

8. An apparatus as in claim 7 wherein said means for forming said opening comprising a punch or chisel having a sharp end adapted to be positioned between said widely-spaced lips formed on said sheets at said position.

9. An apparatus as in claim 3 wherein said panel is arranged generally horizontal and wherein said cylindrical member is arranged with its axis generally vertical.

10. An apparatus as in claim 3 wherein said cylindrical hammering member is mounted to a tool shaft so that said axis of said member is arranged normal to an axis defined by said shaft.

11. An apparatus as in claim 8 wherein said opening comprises an inflation opening.

12. An apparatus as in claim 11 further including means associated with said inflation opening for inflating said tubular passageways in said panel, said inflation means including die means clamped to said panel, said die means having the cavity defining said tubular passageways.

13. In a process for forming an opening in a composite metal panel comprising at least two sheets of metal having a bond therebetween, which can be broken by inflation, said opening extending between said sheets of metal and inwardly of said panel from an edge thereof, said composite panel being adapted for forming a heat exchanger therefrom having a desired pattern of inflated tubular passageways therein, said process comprising:
- hammering with a blunt surface said edge of said panel at a position wherein said opening is to be formed for delineating a bond interface between said sheets of said panel; the improvement wherein;
- said hammering step comprises the steps of providing a hammering member and moving said hammering member to and fro against said edge while simultaneously rocking said member about said edge and a plane of said panel, said hammering step being adapted to upset the metal of said panel at said position at said edge to form widely spaced lips on said sheets to delineate said bond interface;
- whereby improved delineation of said bond interface is provided.

14. A process as in claim 13 further including positioning at said delineated bond interface at said edge of said panel, a means for forming said opening.

15. A process for forming an opening in a composite metal panel comprising at least two sheets of metal having a bond therebetween, which can be broken by inflation, said opening extending between said sheets of metal and inwardly of said panel from an edge thereof, said composite panel being adapted for forming a heat exchanger therefrom having a desired pattern of inflated tubular passageways therein, said process comprising:
- hammering said edge of said panel at a position wherein said opening is to be formed for delineating a bond interface between said sheets of said panel, said hammering step including the steps of providing a hammering member and moving said hammering member to and fro against said edge while simultaneously rocking said member about said edge, said step of providing said hammering member comprising providing a cylindrical member defining a cylindrical hammer surface which is adapted to engage an edge of said panel, said cylindrical member also defining a cylinder axis, and wherein said step of simultaneously rocking said member causes said cylinder axis to rock about a plane of said panel; and
- positioning at said delineated bond interface at said edge of said panel, a means for forming said opening;
- whereby improved delineation of said bond interface is provided.

16. A process as in claim 15 wherein said hammering step is adapted to upset the metal of said panel at said position at said edge to form widely spaced lips on said sheets to delineate a bond interface.

17. A process as in claim 15 wherein said panel is arranged generally horizontal and wherein said cylindrical member is arranged with its axis generally vertical.

18. A process as in claim 15 wherein said step of moving said hammer member to and fro relative to said panel edge comprises vibrating said hammer member and wherein said step of rocking said member comprises reciprocally pivoting said member while it is being vibrated.

19. A process as in claim 18 further including the steps of moving said hammering member to and fro relative to said panel edge in order to engage or disengage said hammering member from said panel edge.

20. A process as in claim 19 further including clamping portions of said panel which are not to be opened while leaving unclamped a portion of said panel wherein said opening is to be formed.

21. A process as in claim 20 wherein said opening comprises an inflation opening and further including the step of applying a fluid under pressure through said inflation opening in order to inflate said pattern of tubular passageways in said panel.

* * * * *